United States Patent
Wei

(10) Patent No.: US 12,062,375 B2
(45) Date of Patent: Aug. 13, 2024

(54) SYSTEMS AND METHODS FOR SEPARATING AND IDENTIFYING AUDIO IN AN AUDIO FILE USING MACHINE LEARNING

(71) Applicant: The MITRE Corporation, McLean, VA (US)

(72) Inventor: Yuan-Jun Wei, Broadlands, VA (US)

(73) Assignee: The MITRE Corporation, McLean, VA (US)

( * ) Notice: Subject to any disclaimer, the term of this patent is extended or adjusted under 35 U.S.C. 154(b) by 58 days.

(21) Appl. No.: 17/545,710

(22) Filed: Dec. 8, 2021

(65) Prior Publication Data

US 2023/0178082 A1 Jun. 8, 2023

(51) Int. Cl.
*G10L 17/18* (2013.01)
*G10L 15/06* (2013.01)
*G10L 15/18* (2013.01)

(52) U.S. Cl.
CPC ............ *G10L 17/18* (2013.01); *G10L 15/063* (2013.01); *G10L 15/18* (2013.01); *G10L 2015/0631* (2013.01)

(58) Field of Classification Search
CPC ....... G10L 17/18; G10L 15/063; G10L 15/18; G10L 2015/0631; G10L 704/232
See application file for complete search history.

(56) References Cited

U.S. PATENT DOCUMENTS

| | | | |
|---|---|---|---|
| 5,822,730 A * | 10/1998 | Roth | G10L 15/187 704/E15.02 |
| 9,571,652 B1 * | 2/2017 | Zeppenfeld | H04L 9/3231 |

(Continued)

FOREIGN PATENT DOCUMENTS

| | | |
|---|---|---|
| CN | 110444201 A | 11/2019 |
| CN | 111105647 A | 5/2020 |

(Continued)

OTHER PUBLICATIONS

Kumar "Audio Source Separation with Deep Learning", located at https://towardsdatascience.com/audio-source-separation-with-deep-learning-e7250e8926f7, visited on Jun. 29, 2021. (18 pages).

(Continued)

*Primary Examiner* — Fariba Sirjani
(74) *Attorney, Agent, or Firm* — Morrison & Foerster LLP

(57) ABSTRACT

Disclosed herein are systems and methods for processing an audio file to perform audio Segmentation and Speaker Role Identification (SRID) by training low level classifier and high level clustering components to separate and identify audio from different sources in an audio file by unifying audio separation and automatic speech recognition (ASR) techniques in a single system. Segmentation and SRID can include separating audio in an audio file into one or more segments, based on a determination of the identity of the speaker, category of the speaker, or source of audio in the segment. In one or more examples, the disclosed systems and methods use machine learning and artificial intelligence technology to determine the source of segments of audio using a combination of acoustic and language information. In some examples, the acoustic and language information is used to classify audio in each frame and cluster the audio into segments.

36 Claims, 7 Drawing Sheets

(56) References Cited

U.S. PATENT DOCUMENTS

| | | | |
|---|---|---|---|
| 10,978,088 B2 | 4/2021 | Short et al. | |
| 2002/0116191 A1* | 8/2002 | Olsen | G10L 15/06 |
| | | | 704/251 |
| 2007/0071206 A1* | 3/2007 | Gainsboro | H04M 3/42221 |
| | | | 379/168 |
| 2012/0263285 A1* | 10/2012 | Rajakumar | G10L 17/00 |
| | | | 379/189 |
| 2014/0142944 A1* | 5/2014 | Ziv | G10L 17/00 |
| | | | 704/250 |
| 2015/0066502 A1* | 3/2015 | Achituv | G10L 15/01 |
| | | | 704/235 |
| 2015/0381801 A1* | 12/2015 | Rajakumar | H04M 3/2281 |
| | | | 379/88.01 |
| 2016/0071526 A1 | 3/2016 | Wingate et al. | |
| 2016/0316059 A1* | 10/2016 | Nuta | G10L 15/04 |
| 2017/0270907 A1* | 9/2017 | Mori | G06F 3/0482 |
| 2018/0122383 A1* | 5/2018 | Raanani | H04M 3/5175 |
| 2018/0342251 A1* | 11/2018 | Cohen | G06V 40/70 |
| 2019/0065464 A1* | 2/2019 | Finley | G06N 3/044 |
| 2021/0020168 A1 | 1/2021 | Dame et al. | |
| 2022/0115000 A1* | 4/2022 | Beaufays | G10L 13/047 |
| 2022/0115020 A1* | 4/2022 | Bradley | G06F 3/0334 |
| 2022/0303502 A1* | 9/2022 | Fisher | H04R 3/005 |
| 2023/0056680 A1* | 2/2023 | Thomas | G10L 15/065 |
| 2023/0065468 A1* | 3/2023 | Lu | G10L 15/26 |
| 2023/0129467 A1* | 4/2023 | Singh | G10L 15/1822 |
| | | | 704/246 |

FOREIGN PATENT DOCUMENTS

| | | |
|---|---|---|
| CN | 111785257 A | 10/2020 |
| CN | 112071330 A | 12/2020 |
| CN | 111968679 B | 1/2021 |

OTHER PUBLICATIONS

Lin, Y. (Mar. 2021). "Spoken Instruction Understanding in Air Traffic Control: Challenge, Technique, and Application," Aerospace 8(65): 1-22.

Xie et al. (May 2019). "Utterance-level Aggregation for Speaker Recognition in the Wild" Research Gate Conference Paper. 7 pages.

Zuluaga-Gomez, J. (2020). "Automatic Speech Recognition Benchmark for Air-Traffic Communications," pp. 1-5.

\* cited by examiner

FIG. 3A

| Word | Label/Identifier | Word Count |
|---|---|---|
| american | controller | 1 |
| twenty | controller | 1 |
| two | controller | 1 |
| turn | controller | 1 |
| left | controller | 1 |
| turn | pilot | 1 |
| left | pilot | 1 |
| american | pilot | 1 |
| twenty | pilot | 1 |
| two | pilot | 1 |

FIG. 3B

| Word | Label/Identifier | Word Count |
|---|---|---|
| american | C | 1 |
| twenty | C | 1 |
| two | C | 1 |
| turn | C | 1 |
| left | C | 1 |
| turn | P | 1 |
| left | P | 1 |
| american | P | 1 |
| twenty | P | 1 |
| two | P | 1 |

FIG. 3C

| Utterance | Label/Identifier | Word Count |
|---|---|---|
| american twenty two turn left | controller | 5 |
| turn left american twenty two | pilot | 5 |

FIG. 3D

| Utterance | Label/Identifier | Word Count |
|---|---|---|
| american twenty two turn left | C | 5 |
| turn left american twenty two | P | 5 |

FIG. 5

| Input audio | start time | duration | speaker label | Confidence score | Segment start | Segment end | Segment confidence score |
|---|---|---|---|---|---|---|---|
| example_audio.wav | 0 | 0.12 | controller | 1 | 0 | | |
| example_audio.wav | 0.12 | 0.15 | controller | 1 | | | |
| example_audio.wav | 0.27 | 0.18 | controller | 1 | | | |
| example_audio.wav | 0.45 | 0.18 | controller | 1 | | | |
| example_audio.wav | 0.63 | 0.66 | controller | 1 | | | |
| example_audio.wav | 1.29 | 0.27 | controller | 1 | | | |
| example_audio.wav | 1.56 | 0.16 | controller | 1 | | | |
| example_audio.wav | 1.72 | 0.2 | controller | 1 | | | |
| example_audio.wav | 1.98 | 0.27 | controller | 1 | | | |
| example_audio.wav | 2.25 | 0.57 | controller | 1 | 0 | 2.82 | 1 |
| example_audio.wav | 2.91 | 0.15 | pilot | 1 | 2.91 | | |
| example_audio.wav | 3.06 | 0.18 | pilot | 1 | | | |
| example_audio.wav | 3.24 | 0.27 | pilot | 1 | | | |
| example_audio.wav | 3.51 | 0.39 | pilot | 1 | | | |
| example_audio.wav | 3.9 | 0.24 | pilot | 1 | | | |
| example_audio.wav | 4.14 | 0.18 | pilot | 1 | | | |
| example_audio.wav | 4.32 | 0.3 | pilot | 1 | | | |
| example_audio.wav | 4.62 | 0.15 | pilot | 1 | | | |
| example_audio.wav | 4.77 | 0.12 | pilot | 1 | 2.91 | 4.89 | 1 |

SYSTEMS AND METHODS FOR SEPARATING AND IDENTIFYING AUDIO IN AN AUDIO FILE USING MACHINE LEARNING

STATEMENT REGARDING FEDERALLY SPONSORED RESEARCH OR DEVELOPMENT

This invention was made with government support under DTFAWA-10-C-00080 awarded by the Federal Aviation Administration. The government has certain rights in the invention.

FIELD OF THE DISCLOSURE

The present disclosure relates generally to systems and methods for processing audio files and in particular to systems and methods for using machine learning, including deep neural network learning, for segmenting and classifying an audio file.

BACKGROUND OF THE DISCLOSURE

Air Traffic Control (ATC) radio voice communications provide critical information on a flight's intent, controller interventions, and the ultimate outcome of each flight operation. As such, ATC radio voice communications provide an important mechanism for coordinating aircraft movement through the National Airspace System. Recorded communications between pilots and controllers, however, have proven difficult to use for large-scale analyses because raw speech audio cannot be directly used in analyses without human or computer intervention. Systems exist for processing audio files to automatically separate and identify speakers, categories of speakers, or sources within an audio file; however, traditional approaches are inefficient and often fail to produce accurate results. Thus, there are increasing demands to develop an accurate and efficient system capable of audio source separation using automatic speech recognition for a variety of applications including, for example, communications between pilots and air traffic control operators. Such a system would also be useful for processing other audio, such as communications on broadcast television, communications over radio other than ATC transmissions, or any other audio recording.

BRIEF SUMMARY

The present disclosure relates to systems and methods for processing an audio file to separate and identify audio from different sources contained within the audio file. According to one or more examples, this disclosure relates to systems and methods for processing an audio file to perform audio Segmentation and Speaker Role Identification (SRID) by training low level classifier and high level clustering components to separate and identify audio from different sources in an audio file by unifying audio separation and automatic speech recognition (ASR) techniques in a single system. In one or more examples, SRID can include the process of separating audio in an audio file into one or more categories, based on a determination of the identity of the speaker or source of audio. In one or more examples, the disclosed systems and methods use machine learning and artificial intelligence technology to model complex relationships between different audio sources and the surrounding environment.

Traditional systems perform SRID poorly when the time period between utterances in an audio file is short. These techniques often rely on periods of non-speech between speakers (typically time periods of 0.25 seconds or longer between speakers) and use simple rules or formulas to combine information from successive frames of audio. Examples of traditional methods include using Digital Signal Processing (DSP) techniques, for instance, spectral energy distribution across frequency bands to identify speakers or energy level (i.e., volume or loudness) to identify breaks between speakers.

The systems and methods disclosed herein address the foregoing deficiencies to facilitate a more efficient and accurate design for audio source separation. The systems and methods described herein do not require non-speech breaks between speech in the audio and may be used to separate audio from different speakers or sources in any audio file in which there is more than one speaker or source. Additionally, the systems and methods disclosed herein use both acoustic and language information simultaneously, thus factoring in more information, and can handle more complex information patterns than traditional DSP methods. The systems and methods disclosed herein further do not require individual tuning to accommodate acoustic differences often present in audio from audio channels or that may occur over time.

In one or more examples, the present disclosure may be applied to analyze Air Traffic Control communications. If Air Traffic Control communications are processed quickly and accurately, they can be used to improve operations in real time. For instance, the analysis can be used to detect safety risk situations and notify the controller. It should be understood, however, that these benefits extend beyond analysis of Air Traffic Control communications to other contexts, such as communications over radio other than ATC communications (e.g., between truck drivers and dispatchers) or communications over broadcast television.

According to one or more examples, processing an audio file includes separating the audio within the audio file into segments of audio generated by different sources and identifying the sources. In one or more examples, this step can be referred to as Segmentation and Speaker-role Identification (SRID). In some examples, an exemplary system comprises one or more machine learning classifiers trained to perform Segmentation and SRID using a supervised or unsupervised training process. The training process may include the creation of one or more language models and one or more acoustic models trained to perform Segmentation and SRID. According to one or more examples, the one or more acoustic models may be a time-delayed neural network and the language model may comprise one or more n-gram statistical language models. In one or more examples, the training procedure may comprise the training techniques for training a system to perform automatic speech recognition, but instead of training the system to identify spoken words in an audio file, the system is trained to identify the speakers or sources of the audio.

In one or more examples, the one or more acoustic models may be trained using an input comprising a sequence of speech feature vectors. In one or more examples, the language model may be trained comprising a sequence of class labels (i.e., identifiers) mapped to audio. In one or more examples, the training data may include a transcription of communications between one or more pilots and one or more air traffic controllers. The transcription according to one or more examples may include a label identifying the source of each segment or utterance, or portion of each segment or utterance, in an audio file, for example, the label may identify the source of the audio in ATC communications as "pilot" or "controller." The training data may also include a transcription of each utterance or segment in the audio file and an indication of the number of words in each utterance or segment.

According to one or more examples, after training the one or more machine learning classifiers, an audio file may be received, wherein the audio file may be live or recorded audio. After receiving an audio file, one or more machine learning classifiers may separate and identify audio from different sources in the audio file. In one or more examples, separating and identifying audio from different sources in the audio file may include applying a clustering process and classification process. In one or more examples, the clustering and classification processes may include separating the audio in the audio file into one or more segments, identifying the start and stop time of the one or more segments, and identifying the speaker or source of the audio in the one or more segments.

In one or more examples, a segment may be a duration of audio in the audio file determined to be associated with one of the sources of audio. In one or more examples, a segment may comprise a sequence of segment fragments, the segment fragments comprising a plurality of frames in the audio file determined to contain audio originating from the same source. In one or more examples, the frames may be units of audio of a pre-determined length of time in the audio file. In one or more examples, a segment may be an individual radio transmission including any one of speech, silence, noise, or any combination thereof. According to one or more examples, the system may assign one or more identifiers to the frames, segments, and/or segment fragments based at least in part on acoustic information and language information used by the one or more acoustic models and one or more language models to determine the probability that the frames, segments, and segment fragments originated from one or more of the identified sources.

According to one or more examples, the system may further provide an output. The output may include the identifier corresponding to each segment and segment fragment, utterance, word, frame or other varying duration of audio in the audio file and a time mark corresponding to the duration of the segment and segment fragment, utterance, word, frame, or other duration of audio. In one or more examples, the time mark may include one or more of a start time for each segment and segment fragment, an end time for each segment and segment fragment, and a duration of each segment and segment fragment. The output may further include one or more confidence scores representing the probability that the system has correctly identified the source of the audio for each segment and segment fragment.

An exemplary system comprises: one or more processors; and a memory storing one or more programs, the one or more programs configured to be executed by the one or more processors and including instructions for: receiving an audio file wherein the audio file comprises audio from at least a first source and a second source; identifying one or more frames in the audio file, wherein each frame corresponds to a pre-determined length of time in the audio file; generating a plurality of acoustic scores and language scores for each identified frame in the audio file; for each identified frame in the audio file, determining a first probability that the frame is associated with the first source and determining a second probability that the frame is associated with the second source, wherein the first probability and the second probability are based on the generated plurality of acoustic scores and language scores corresponding to the frame; and identifying one or more segments in the audio file, wherein each segment corresponds to a group of contiguous frames associated with either the first source or the second source, wherein the identification of the one or more segments is based on the determined first and second probabilities for each frame.

In some embodiments, determining the first probability and the second probability comprises applying a classification process to each frame, and wherein the classification process comprises: determining, based upon the product of the acoustic scores and language scores generated for the first source, a first probability that the frame is associated with the first source; determining, based upon a product of the acoustic scores and language scores generated for the second source, a second probability that the frame is associated with the second source; and assigning the first probability to the first source and the second probability to the second source.

In some embodiments, identifying the one or more segments in the audio file comprises applying a clustering process to the identified one or more frames, wherein the clustering process comprises: generating a clustering score for each possible grouping of contiguous frames, wherein the clustering score is based upon the determined first and second probabilities for each frame; and identifying the grouping with the highest clustering score as the optimal grouping.

In some embodiments, the one or more identified segments comprise a plurality of segment fragments, the segment fragments comprising a plurality of frames wherein the frames in each segment fragment comprise audio determined to have originated from the same source based upon the acoustic scores and language scores calculated for each frame in the segment fragment.

In some embodiments, the acoustic scores are generated for each frame in the audio file based upon one frame of speech feature vector, and wherein each acoustic score represents a probability that the audio in each frame corresponds to one of the one or more sources.

In some embodiments, the language scores are generated for each frame in the audio file based upon the relationship of a previous frame to one of the one or more sources, and wherein each language score represents a probability that audio in each frame corresponds to one of the one or more sources.

In some embodiments, the system further comprises instructions for providing an output, the output comprising: a plurality of identifiers, wherein the identifiers represent the source of audio in each segment; and a plurality of time marks, wherein the time marks represent the duration of the segments.

In some embodiments, the system further comprises instructions for providing an output, the output comprising: a plurality of identifiers, wherein the identifiers represent the source of audio in each segment and segment fragment; and a plurality of time marks, wherein the time marks represent the duration of the segments and segment fragments.

In some embodiments, the acoustic scores are generated by one or more acoustic models.

In some embodiments, the one or more acoustic models is a neural network.

In some embodiments, the language scores are generated by one or more statistical language models.

In some embodiments, the one or more statistical language models is an n-gram statistical language model.

In some embodiments, the group of contiguous frames comprises frames that are adjacent in time in the audio file.

In some embodiments, the beginning of each segment corresponds to the beginning of a duration of audio originating from one of the first source or the second source.

An exemplary non-transitory computer readable storage medium storing one or more programs for processing an audio file, the one or more programs configured to be executed by one or more processors and includes instructions for: receiving an audio file wherein the audio file comprises audio from at least a first source and a second source; identifying one or more frames in the audio file, wherein each frame corresponds to a pre-determined length of time in the audio file; generating a plurality of acoustic scores and language scores for each identified frame in the audio file; for each identified frame in the audio file, determining a first probability that the frame is associated with the first source and determining a second probability that frame is associated with the second source, wherein the first probability and the second probability are based on the generated plurality of acoustic scores and language scores corresponding to the frame; and identifying one or more segments in the audio file, wherein each segment corresponds to a group of contiguous frames associated with either the first source or the second source, wherein the identification of the one or more segments is based on the determined first and second probabilities for each frame.

In some embodiments, determining the first probability and the second probability comprises applying a classification process to each frame, and wherein the classification process comprises: determining, based upon the product of the acoustic scores and language scores generated for the first source, a first probability that the frame is associated with the first source; determining, based upon a product of the acoustic scores and language scores generated for the second source, a second probability that the frame is associated with the second source; and assigning the first probability to the first source and the second probability to the second source.

In some embodiments, identifying the one or more segments in the audio file comprises applying a clustering process to the identified one or more frames, wherein the clustering process comprises: generating a clustering score for each possible grouping of contiguous frames, wherein the clustering score is based upon the determined first and second probabilities for each frame; and identifying the grouping with the highest clustering score as the optimal grouping.

In some embodiments, the one or more identified segments comprise a plurality of segment fragments, the segment fragments comprising a plurality of frames wherein the frames in each segment fragment comprise audio determined to have originated from the same source based upon the acoustic scores and language scores calculated for each frame in the segment fragment.

In some embodiments, the acoustic scores are generated for each frame in the audio file based upon one frame of speech feature vector, and wherein each acoustic score represents a probability that the audio in each frame corresponds to one of the one or more sources.

In some embodiments, the language scores are generated for each frame in the audio file based upon the relationship of a previous frame to one of the one or more sources, and wherein each language score represents a probability that audio in each frame corresponds to one of the one or more sources.

In some embodiments, the one or more programs configured to be executed by the one or more processors further include instructions for providing an output, the output comprising: a plurality of identifiers, wherein the identifiers represent the source of audio in each segment; and a plurality of time marks, wherein the time marks represent the duration of the segments.

In some embodiments, the one or more programs configured to be executed by the one or more processors further include instructions for providing an output, the output comprising: a plurality of identifiers, wherein the identifiers represent the source of audio in each segment and segment fragment; and a plurality of time marks, wherein the time marks represent the duration of the segments and segment fragments.

In some embodiments, the acoustic scores are generated by one or more acoustic models.

In some embodiments, the one or more acoustic models is a neural network.

In some embodiments, the language scores are generated by one or more statistical language models.

In some embodiments, the one or more statistical language models is an n-gram statistical language model.

In some embodiments, the group of contiguous frames comprises frames that are adjacent in time in the audio file.

In some embodiments, the beginning of each segment corresponds to the beginning of a duration of audio originating from one of the first source or the second source.

An exemplary method comprises: receiving an audio file wherein the audio file comprises audio from at least a first source and a second source; identifying one or more frames in the audio file, wherein each frame corresponds to a pre-determined length of time in the audio file; generating a plurality of acoustic scores and language scores for each identified frame in the audio file; for each identified frame in the audio file, determining a first probability that the frame is associated with the first source and determining a second probability that frame is associated with the second source, wherein the first probability and the second probability are based on the generated plurality of acoustic scores and language scores corresponding to the frame; and identifying one or more segments in the audio file, wherein each segment corresponds to a group of contiguous frames associated with either the first source or the second source, wherein the identification of the one or more segments is based on the determined first and second probabilities for each frame.

In some embodiments, determining the first probability and the second probability comprises applying a classification process to each frame, and wherein the classification process comprises: determining, based upon the product of the acoustic scores and language scores generated for the first source, a first probability that the frame is associated with the first source; determining, based upon a product of the acoustic scores and language scores generated for the second source, a second probability that the frame is associated with the second source; and assigning the first probability to the first source and the second probability to the second source.

In some embodiments, identifying the one or more segments in the audio file comprises applying a clustering process to the identified one or more frames, wherein the clustering process comprises: generating a clustering score for each possible grouping of contiguous frames, wherein the clustering score is based upon the determined first and second probabilities for each frame; and identifying the grouping with the highest clustering score as the optimal grouping.

In some embodiments, the one or more identified segments comprise a plurality of segment fragments, the segment fragments comprising a plurality of frames wherein the frames in each segment fragment comprise audio determined to have originated from the same source based upon the acoustic scores and language scores calculated for each frame in the segment fragment.

In some embodiments, the acoustic scores are generated for each frame in the audio file based upon one frame of speech feature vector, and wherein each acoustic score represents a probability that the audio in each frame corresponds to one of the one or more sources.

In some embodiments, the language scores are generated for each frame in the audio file based upon the relationship of a previous frame to one of the one or more sources, and wherein each language score represents a probability that audio in each frame corresponds to one of the one or more sources.

In some embodiments, the method further comprises providing an output, the output comprising: a plurality of identifiers, wherein the identifiers represent the source of audio in each segment; and a plurality of time marks, wherein the time marks represent the duration of the segments.

In some embodiments, the method further comprises providing an output, the output comprising: a plurality of identifiers, wherein the identifiers represent the source of audio in each segment and segment fragment; and a plurality of time marks, wherein the time marks represent the duration of the segments and segment fragments.

In some embodiments, the acoustic scores are generated by one or more acoustic models.

In some embodiments, the one or more acoustic models is a neural network.

In some embodiments, the language scores are generated by one or more statistical language models.

In some embodiments, the one or more statistical language models is an n-gram statistical language model.

In some embodiments, the group of contiguous frames comprises frames that are adjacent in time in the audio file.

In some embodiments, the beginning of each segment corresponds to the beginning of a duration of audio originating from one of the first source or the second source.

BRIEF DESCRIPTION OF THE FIGURES

FIG. 3A-D illustrate an exemplary training dataset according to the examples described herein.

FIG. 5 illustrates an exemplary output of the systems and methods described herein.

DETAILED DESCRIPTION OF THE DISCLOSURE

Figure 1:
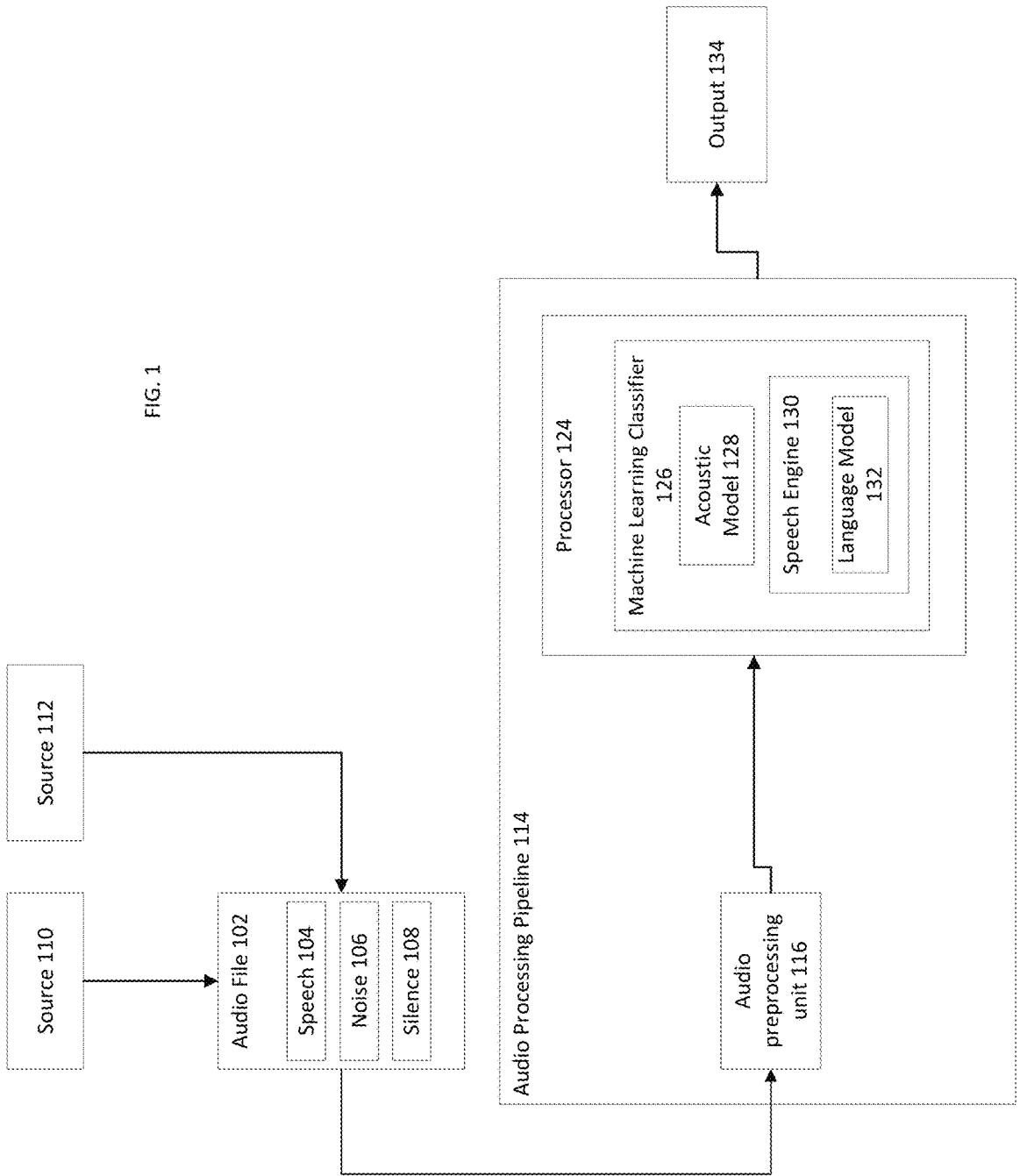
FIG. 1 illustrates a block diagram of a system for processing audio files in accordance with the examples described herein.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Described herein are systems and methods for processing an audio file to separate and identify audio from different sources contained within the audio file. According to one or more examples, the systems and methods for processing an audio file perform audio Segmentation and SRID by training low level classifier and high level clustering components to separate and identify audio in an audio file by unifying audio separation and automatic speech recognition (ASR). According to one or more examples, an audio file is received by a system comprising one or more machine learning classifiers. The one or more machine learning classifiers may be trained to perform segmentation and SRID by mapping a word corpus into a speaker role based corpus. Upon receiving the file, the system may apply the one or more machine learning classifiers to cluster and classify the audio in the audio file. According to one or more examples, the system may then provide an output including one or more identifiers (also referred to as speaker labels), one or more time marks, and one or more confidence scores.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The structure for a variety of these systems will appear from the description below. In addition, the present invention is not described with reference to any particular programming language. It will be appreciated that a variety of programming languages may be used to implement the teachings of the present disclosure as described herein.

Throughout the disclosure, reference is made to use of the systems or methods or aspects of the systems and method described herein for identifying and separating audio within air traffic control (ATC) audio files, for instance one or more audio files including transmissions between pilots and air traffic controllers. However, reference to ATC audio is for illustrative purposes only and is not meant to be limiting. Embodiments of systems and methods described herein can be used for any system, group of systems, installation, group of installations, facility, group of facilities, etc., in which there is a need for processing audio files to separate and identify audio from different sources contained within the audio files. For example, systems and methods can be used for processing audio files to separate and identify audio from different sources wherein the audio file includes transmissions between truck drivers and dispatchers, train drivers or engineers and transit system operators, communications over broadcast television, or any other audio file which may benefit from separation and identification of the sources generating audio in the audio file.

FIG. 1 illustrates a system 100 for automatically separating and identifying audio contained within an audio file. In one or more examples of the disclosure, system 100 can include audio processing pipeline 114, which may include audio preprocessing unit 116 and processor 124, and which can be configured to perform the methods described herein for separating and identifying the source of audio contained in an audio file 102 that is received by the system 100. Audio file 102 may include audio from one or more sources 110 and 112. The audio in audio file 102 may include any one or more of speech 104, noise 106, and silence 108. Audio file 102 may be received by audio processing pipeline 114, and specifically at audio preprocessing unit 116. In one or more examples, audio preprocessing unit 116 can be configured to convert the audio file 102 into a format that can be used by processor 124 to process and perform segmentation and SRID on the received audio file. In this way, while audio file 102 can be received in any number of formats, audio preprocessing unit 116 can be configured to convert the received file into a common format that is used by processor 124 to perform segmentation and SRID. In one or more examples of the disclosure, audio file 102 may be processed at processor 124 by one or more machine learning classifiers 126 collectively configured to perform segmentation and SRID on the received audio files. In one or more examples, the one or more machine learning classifiers may include one or more acoustic models 128 and a speech engine 130 including a language model 132 (described in further detail below with reference to FIG. 6). After the one or more machine learning classifiers 126 are applied to audio, the system 100 may provide an output 134. In one or more examples, output 134 can include a text file that identifies the speaker of each segment or utterance in the audio file. In one or more examples, the output may include one or more time marks corresponding to one or more varied durations of audio identified during the clustering and classifying processes (e.g., each segment and segment fragment), one or more identifiers identifying sources of varied durations of audio in the audio file, and one or more confidence scores. Further details regarding the foregoing components of system 100 are provided below.

In one or more examples, and specifically in the context of performing SRID on recording of air traffic control interactions between one or more pilots and a ground controller, the audio file 102 may be a recording captured by the Digital Audio Legal Recorder (DALR), a Federal Aviation Administration (FAA) system for capturing, compressing, encoding, and storing controller-pilot voice communications within a facility. Thus, in one or more examples, sources 110 and 112 may be one or more air traffic controllers and one or more pilots, respectively. The audio file may include a recording of all audio received at the controller position, which can include both speech between controllers and pilots and speech between different controllers (either within the same facility or between facilities), or may only include audio transmitted and received over the radio, which would include only communications between controllers and pilots for specific frequencies.

In one or more examples, the DALR may not record push-to-talk information that delineates the start and end of each controller radio transmission and may not retain information about which speech is from controllers and which speech is from pilots, thus requiring SRID post recording of the audio. The DALR system may store continuous stretches of non-silence audio in individual files, retaining the time associated with the audio as metadata. A DALR file may not correspond directly to individual transmissions. For example, one DALR file may be only a few seconds long, containing one controller transmission and pilot readback, and another may be several minutes long and contain many transmissions. As such, a DALR may correspond to any number of transmissions.

Throughout the disclosure, the systems and methods presented herein may be presented using the context of aviation air traffic control audio, however the examples should not be seen as limiting. According to one or more examples, audio file 102 may be a file other than a recording captured by the DALR. For example, audio file 102 may be a recording of communications between truck drivers and dispatch personnel. Alternatively, audio file 102 may be a recording of communications over broadcast television. It should be understood that audio file 102 may be any audio recording that can be processed to separate audio originating from different sources and identify the sources of audio in the audio file.

According to one or more examples, audio file 102 may be a live (real-time) series of transmissions between one or more sources. For example, audio file 102 may be a series of real time communications between one or more pilots and one or more air traffic controllers. Real-time communications may be continuously received and processed by system 100 to separate and identify audio originating from different sources in the transmissions.

According to one or more examples, a DALR audio file may be received from the DALR Remote Audio Access System (DRAAS), which is an FAA system designed to provide a mechanism for remote and automated access. Through the DRAAS interface, DALR recordings can be retrieved remotely by using the facility name, DALR channel number, and a date and time period. Through DRAAS, access to 129 National Airspace System (NAS) facilities is provided and over 200,000 hours of silence reduced audio are recorded each month, making manual SRID a time and resource intensive process.

As described in further detail below, according to one or more examples, audio file 102 may undergo optional pre-processing upon receipt. Thus, in one or more examples, the received audio file may or may not remain in the same format as the recordings obtained through the DRAAS interface. In one or more examples, a raw audio file retrieved from the DRAAS interface may have variable duration, may contain speech data from one or more speaker turns (e.g., each controller and pilot transmission is considered a speaker turn), and each speaker turn may be generated by a different speaker. Audio file 102, however, does not have to be received from the DRAAS. The audio file may be received from any other source.

According to one or more examples, as described above, source 110 may be one or more air traffic controllers and source 112 may be one or more pilots. Audio file 102 may be a recording of communications between pilots and controllers. Sources 110 and 112, however may be any other audio generating source. For instance, source 110 may be one or more dispatchers and source 112 may be one or more truck drivers. The audio file 102 may be a recording of communications between the one or more dispatchers and one or more truck drivers. It should be understood that sources 110 and 112 can be any audio generating source. Additionally, it should be understood that FIG. 1 is not meant to limit the number of sources generating the audio contained in audio file 102. Although the figure shows two sources, this is meant to be illustrative and there may be any number of sources generating audio contained in audio file 102. Further, sources 110 and 112 should be understood to represent either individual sources or groups of sources. For instance, source 110 may be either one pilot or may be a group of pilots generating audio in audio file 102. Similarly, source 112 may be either one controller or may be a group of controllers generating audio in audio file 102. As such, a source may be an individual person speaking, a group of individuals with a common role (e.g., air traffic controller, pilot, etc.), or non-human sound including but not limited to noise or silence.

According to one or more examples, the audio file 102 may undergo decompression (i.e., undoing any compression applied to the audio file before it was transmitted to the system 100) upon receipt, for instance, at audio preprocessing unit 116. Audio file 102 may be packaged by audio preprocessing unit 116 with metadata, such as its source facility, radio channel, controller position, and start and end times of the audio files. According to one or more examples, the raw audio may be converted by audio preprocessing unit 116 into 8 kHz, 16 bits, linear PCM format for Mel Frequency Cepstral Coefficient (MFCC) feature extraction with 40 parameters. It should be understood that the formatting described above is not limiting. The audio file may be provided in any format fit for segmentation and SRID.

According to one or more examples, after audio file 102 undergoes preprocessing, it may be received by processor 124. Processor 124 may include one or more machine learning classifiers 126 capable of processing audio file 102 to perform segmentation and SRID. In one or more examples, SRID may be a speech-to-text task including a clustering process and a classifying process using a vocabulary with one or more identifiers. In one or more examples, the vocabulary may be a two-word vocabulary using the words "pilot" and "controller." However, the vocabulary may include any number of other identifiers.

In one or more examples, the one or more machine learning classifiers may include one or more acoustic models 128 and a speech engine 130 including one or more language models 132. According to one or more examples, the one or more acoustic models 128 may be a 6-hidden layer Time Delayed Neural Network (TDNN) with 256 nodes with MFCC (Mel Frequency Cepstral Coefficient) of 40 basic parameters. The one or more acoustic models may, however, be any type of acoustic model. According to one or more examples, the one or more language models 132 may include one or more n-gram statistical language models. However, the language model 132 can be any type of language model.

In one or more examples, the one or more acoustic models 128 may assign one or more acoustic scores to each frame in the audio, wherein each acoustic score corresponds to whether audio in the frame originated from one of the one or more sources and is determined based upon acoustic information (e.g., speech feature vectors) in the audio file. In one or more examples, the one or more language models 132 may use various statistical and probabilistic techniques to determine the probability that audio in each frame of the audio file originates from one of the one or more sources based upon the determined source of the audio in one or more of the preceding frames. As described throughout, and in further detail below with reference to FIG. 6, the one or more acoustic models and one or more statistical language models may be used to calculate a plurality of acoustic model scores and statistical language model scores for each frame in the audio file. In one or more examples, the frame level acoustic scores and language scores may be used in conjunction to determine one or more probabilities (i.e., a frame level soft classification) that each frame is associated with one or more of the sources of audio in the audio file. According to one or more examples, the accumulated frame level acoustic model scores and statistical language model scores may be used in conjunction to determine the source of audio in varying durations of the audio file (i.e., segments and segment fragments).

In one or more examples, after processing audio file 102 to separate audio from different sources contained within the audio file and identifying the sources of varying durations of audio within the audio file, the system 100 may provide an output 134. In one or more examples, the output may be a text file including one or more time marks corresponding to one or more varying durations of audio identified by the system 100 (e.g., each segment and segment fragment), one or more identifiers identifying sources of varied durations of audio in the audio file, and one or more confidence scores.

According to one or more examples, the one or more time marks provided in the output may include any one or more of a start time, an end time, and a duration of each segment and segment fragment determined by the system. In one or more examples, the one or more time marks may include a start time corresponding to the beginning of each segment and segment fragment, a duration corresponding to the duration of each segment and segment fragment, and an end time corresponding to the end of each segment and segment fragment. It should be understood, however, that the time marks provided in output 134 are not limited to an indication of the start time, end time, and duration of the segments and segment fragments in the audio file.

According to one or more examples, the one or more confidence scores provided in the output may be computed representing the confidence level that the correct identifier has been assigned to each segment and segment fragment. A confidence score may be computed for each segment and segment fragment based on the probability that the audio in each segment and segment fragment corresponds to one of the plurality of sources. An exemplary illustration of an output file is described below with reference to FIG. 5.

Figure 2:
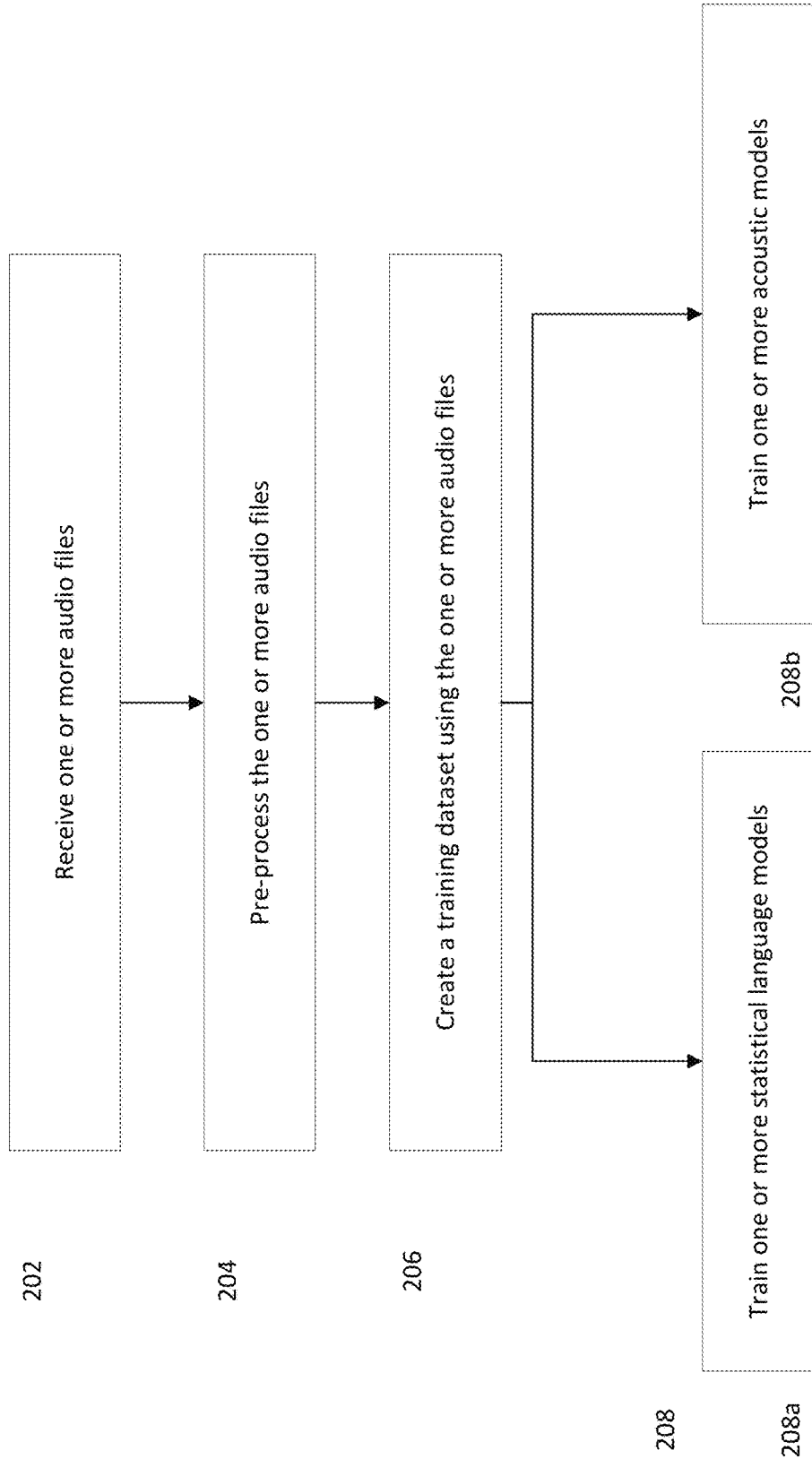
FIG. 2 illustrates a flow diagram of an exemplary method for training a machine learning classifier in accordance with the examples described herein.

FIG. 2 illustrates a flow diagram representing a method for training the one or more machine learning classifiers described in FIG. 1 to perform segmentation and SRID. In one or more examples, the process 200 can begin at step 202 wherein one or more audio files are received. According to the example described herein with respect to FIG. 2, the audio file 102 may be a recording captured by the DALR system for capturing, compressing, encoding, and storing controller-pilot voice communications. However, as described above with respect to FIG. 1, the one or more audio files received at step 202 may be any audio file. In one or more examples, the audio file may be a recording of communications between a plurality of sources. As described above with respect to FIG. 1, the plurality of sources may include one or more pilots and one or more air traffic controllers. It should be understood, however, that the plurality of sources may include any audio generating sources.

In one or more examples, after the audio file has been received at step 202, the one or more audio files may be pre-processed at step 204. In one or more examples, the one or more audio files received at step 202 may be pre-processed to convert the raw audio file or files into a desired format for use in training one or more machine learning classifiers to perform segmentation and SRID. For instance, at step 204, the one or more audio files may be pre-processed by an audio pre-processing unit to decompress the audio file. The one or more audio files may also be packaged with metadata, such as its source facility, radio channel, controller position, and start and end times of the audio files by the audio preprocessing unit at step 204. Metadata can be used to improve system accuracy by providing non-audio context that describes or identifies the set of speakers or sources. According to the example described herein with respect to FIG. 2, the raw audio may be converted by audio preprocessing unit 116 into 8 kHz, 16 bits, linear PCM format for MFCC feature extraction with 40 parameters.

After the audio file has been pre-processed at step 204, in one or more examples, the process 200 can move to step 206 wherein the one or more audio files may be used to create a training dataset that can be used to train one or more machine learning classifiers. It should be understood, however, that these steps may be performed in a different order. For instance, the one or more audio files may be used to create a training dataset before undergoing pre-processing at step 204. In some examples, the one or more audio files may never undergo any preprocessing and the raw audio files may be used to train the one or more machine learning classifiers.

At step 206, the one or more audio files may be used to create a training dataset. According to the example described herein with respect to FIG. 2, the training dataset is created by transcribing the one or more audio files received at step 202. Transcribing the audio file or files can be performed in a variety of methods. For instance, in one or more examples, the one or more audio files can be transcribed by a human or humans who listen to the audio file or files and transcribe the audio in the audio files. Alternatively or additionally, training datasets can be harvested from audio files that have previously been classified by a machine learning classifier. In this way, the one or more machine learning classifiers can be constantly improved with new training data (i.e., by taking information from previously classified audio) so as to improve the overall accuracy of the machine learning classifier. In one or more examples, the training data may include any number of transcribed words, utterances or segments sufficient to train the one or more machine learning classifiers. According to one or more examples, however, creating the training dataset does not require an accurate transcription of the individual words in the audio file. Word-level transcription accuracy is not required to create the training dataset because the system is trained to identify sources of audio, not to transcribe the individual words spoken by the sources of the audio.

According to one or more examples, creating a training dataset includes assigning or mapping one or more speaker labels or identifiers to each word, utterance or segment, or any combination thereof, in the audio file. In one or more examples, the speaker labels or identifiers may be chosen from a two-word vocabulary: "controller" and "pilot." However, it should be understood that the vocabulary may contain any number of different words that can be used as identifiers or labels in the training dataset. For example, the text "american twenty two turn left" may be mapped to a string of controller labels. The string of controller labels may be "controller controller controller controller controller" or "CCCCC," with each letter of the string corresponding to a word in the text. Similarly, the text "turn left american twenty two" from a pilot transmission may be mapped to a string of pilot role labels "pilot pilot pilot pilot pilot" or "PPPPP." It should be understood, however, that the number of speaker labels or identifiers does not have to equal the number of words or number of utterances. In one or more examples, the number of speaker labels or identifiers may be more than or fewer than the number of utterances or words. Exemplary training datasets are described with reference to FIGS. 3A-3D described in further detail below.

In one or more examples, after the training dataset is created at step 206, the one or more machine learning classifiers can be trained at step 208 to perform segmentation and speaker role identification. According to one or more examples, the one or more machine learning classifiers may include one or more acoustic models and language models. In one or more examples, the language model may be trained separately from the acoustic model. In one or more examples, the training procedure may comprise substantially the same training techniques for training a system to perform automatic speech recognition, but instead of training the system to identify spoken words in an audio file, the system is trained to identify the speakers or sources of the audio.

According to one or more examples, the language model may be trained at step 208a to calculate one or more language model scores, wherein the one or more language model scores may be scores corresponding to a probability that audio in each frame in the audio file corresponds to one of the one or more sources based on the relationship of a previous frame to one of the one or more sources. In one or more examples, transmissions from a first source may be controller transmissions and transmissions from a second source may be pilot transmissions. In one or more examples, the statistical language model may be trained using training datasets similar to the training datasets described above with reference to step 206 to calculate one or more language model scores for each frame in the audio file representing a probability that the frame will contain controller speech, pilot speech, or silence based upon the relationship of a previous frame to one of the one or more sources. In one or more examples, the training datasets used as an input to train the language model may comprise any sequence of class labels (i.e., identifiers) mapped to audio. In one or more examples, the language model may be an N-gram (e.g., trigram statistical language model) with speaker role labels. It should further be understood that the system may implement any type of statistical language model, as described above with reference to FIG. 1.

According to one or more examples, the one or more acoustic models may be trained at step 208b to calculate one or more acoustic scores. In one or more examples, the one or more acoustic models may be trained independently from the language model. The one or more acoustic model scores may be scores corresponding to a probability that audio in each frame in the audio file originated from one of the one or more sources. In one or more examples, the one or more acoustic models may be trained using a sequence of speech feature vectors. According to one or more examples, training the acoustic model may include mono-phone to tri-phone Hidden Markov Model-Gaussian Mixture Model (HMM-GMM) training followed by alignment to generate the phonetic labeling data for supervised deep neural network training. In one or more examples, a Kaldi Time-delay Deep Neural Network (TDNN) chain Latice-Free Maximum Mutual Information (LF-MMI) structure may be provided to train DNN-HMM hybrid acoustic models. Additionally and/or alternative to, in one or more examples, the training process may also include steps of volume perturbation to reduce the audio amplitude influence, with one-third frame sub-sampling for optimizing GPU calculation and improving real time factor. It should be understood, however, that any method of training an acoustic model may be implemented to train the acoustic model.

As described below with reference to FIG. 6, the one or more acoustic models and statistical language models may be trained to calculate acoustic model scores and statistical language model scores for each frame in the audio file. According to one or more examples, the accumulated frame level acoustic model scores and statistical language model scores may be used in conjunction to determine the source of audio in varying durations of the audio file (i.e., segments and segment fragments).

FIGS. 3A-3D illustrate exemplary training datasets according to the disclosure set forth herein. FIG. 3A illustrates an exemplary training dataset including three columns. The first column provides a transcription of each word in the one or more audio files. The second column provides a speaker label or identifier assigned to each word. In FIG. 3A, the labels or identifiers are either "controller" or "pilot" and indicate that the source of the spoken word is either an air traffic controller or pilot, or a group of air traffic controllers or a group of pilots. The third column in FIG. 3A provides a count of the words in each respective row.

FIG. 3B provides an illustration of another exemplary training dataset. The first and third columns in exemplary training dataset in FIG. 3B are identical to those in FIG. 3A, but column two uses "C" or "P" as the label or identifier corresponding to the source of the word. FIG. 3C provides another illustration of an exemplary training dataset in which each utterance (i.e., segment) is provided in the first column rather than a single word. In the second column of FIG. 3C, a label or identifier (e.g., "pilot" or "controller" or any other identifier or label) is assigned to the utterance. In the third column of FIG. 3C, a word count is provided indicating the number of words contained in the utterance. FIG. 3D is identical to FIG. 3C, except that "C" and "P" are used as the identifiers or labels in the second column rather than "pilot" or "controller."

It should be understood that the exemplary training datasets provided in FIGS. 3A-3D are illustrative and not meant to be limiting. "Pilot" or "P" and "Controller" or "C" are merely used for illustrative purposes as identifiers or labels corresponding to sources of audio within the one or more audio files used to create the training dataset. In one or more examples, the sources of the audio in the one or more audio files may not be a pilot or controller, but some other source. For instance, as described above, the sources of audio may be truck drivers and dispatchers communicating over radio, one or more people communicating over broadcast television, or any other audio generating source.

Figure 4:
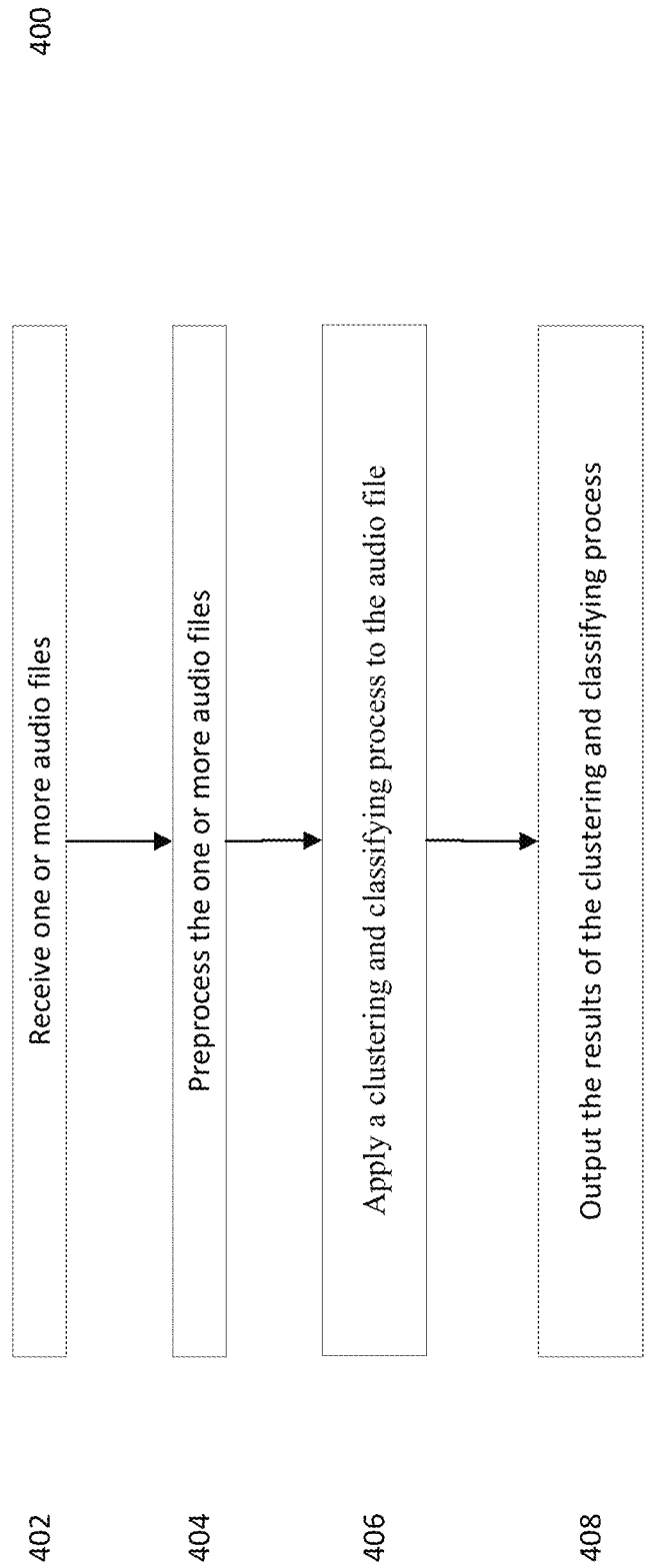
FIG. 4 illustrates a flow diagram of a method for processing audio files and generating an output in accordance with the examples described herein.

FIG. 4 illustrates a flow diagram of a method for processing audio files in accordance with the examples described herein. In one or more examples, the process 400 can begin at step 402 wherein one or more audio files comprising audio from a plurality of sources is received. As described with reference to FIG. 1, the one or more audio files may be a live (real-time) series of transmissions between one or more sources, a recording of communications between one or more groups or individuals, or any audio file containing speech, noise, or silence, or any combination of speech, noise, and silence. After receiving the one or more audio files at step 402, the process 400 can move to step 404, wherein the file or files may be preprocessed to convert the one or more audio files into common format for carrying out the method described herein. However, it should be understood that preprocessing the one or more audio files at step 404 is an optional step and not necessary for performing the remainder of this method.

After receiving the one or more audio files at step 402 and optionally preprocessing the one or more audio files at step 404, the process 400 can move to step 406 wherein a clustering and classifying process may be applied to the audio file to separate and identify the audio from different sources within the one or more audio files. In one or more examples, classification and clustering may be carried out concurrently (i.e., the system may jointly carry out classification at a frame level and clustering at an utterance or segment level, as described below with reference to FIG. 6). According to one or more examples, the clustering and classifying process may be applied by one or more machine learning classifiers. The one or more machine learning classifiers may include one or more acoustic models and a speech engine including one or more language models having been trained to perform segmentations and SRID. In one or more examples the one or more acoustic models and one or more language models may have been trained according to examples described herein with respect to the exemplary flowchart provided in FIG. 2.

According to one or more examples, applying the clustering and classifying processes at step 406 may include applying the one or more acoustic models and one or more statistical language models to identify and separate one or more segments in the audio file, determining the start and end time of each segment and segment fragment, and assigning identifying labels to the one or more frames, segments, and/or segment fragments. As described throughout, a segment may include any one or more of speech containing a word or words, a phrase, a sentence, noise, silence, or any combination thereof originating from the same source and a segment fragment may comprise a plurality of frames within a segment in the audio file determined to contain audio originating from the same source. Identifying and separating the one or more segments in the audio file may be accomplished using acoustic and language information simultaneously. As described throughout, and in further detail below with reference to FIG. 6, the one or more acoustic models and one or more statistical language models may be used to calculate a plurality of acoustic model scores and statistical language model scores for each frame in the audio file. In one or more examples, the frame level acoustic scores and language scores may be used in conjunction to determine one or more probabilities (i.e., a frame level soft classification) that each frame is associated with one or more of the sources of audio in the audio file. According to one or more examples, the accumulated frame level acoustic model scores and statistical language model scores may be used in conjunction to determine the source of audio in varying durations of the audio file (i.e., segments and segment fragments).

In one or more examples, audio may be clustered based upon the source of the audio, including by groups of speakers. For instance audio may be separated based upon whether the source of the audio is a pilot or controller, and there may be one or more different pilots and one or more different controllers speaking within an audio file. Thus, audio may be clustered according to whether the source is any pilot in a group of pilots or any controller in a group of controllers. More detail pertaining to the clustering and classifying process is provided below with reference to FIG. 6.

According to one or more examples, non-audio context information may be used to improve the accuracy of the clustering and classifying processes. In one or more examples, non-audio context information may be anything that identifies or describes the set of speakers or sources, audio-channels or other characters that describe the acoustic or language characteristics of the audio (e.g., metadata attached to the audio file). In one or more examples, non-audio context information can be used to determine if a new identifier, and associated acoustic model, is needed to represent a source of audio in the audio file. For example, if SRID performs poorly for audio received from facility A, two labels may be provided (e.g., "A_Controller" and "A_Pilot") to train the system to perform SRID on audio received from facility A.

According to one or more examples, after applying the clustering and classifying processes at step 406, the process can move on to provide an output at step 408. According to one or more examples, the output may include one or more time marks corresponding to one or more varied durations of audio identified during the clustering and classifying processes (e.g., each segment and segment fragment), one or more identifiers identifying sources of varied durations of audio in the audio file, and one or more confidence scores.

According to one or more examples, the one or more time marks provided in the output may include any one or more of a start time, an end time, and a duration of each segment and segment fragment determined by the clustering and classifying process. In one or more examples, the one or more time marks may include a start time corresponding to the beginning of each segment and segment fragment, a duration corresponding to the duration of each segment and segment fragment, and an end time corresponding to the end of each segment and segment fragment. It should be understood, however, that the time marks provided in output 134 are not limited to an indication of the start time, end time, and duration of the segments and segment fragments in the audio file.

According to one or more examples, the one or more confidence scores provided in the output may be computed representing the confidence level that the correct identifier has been assigned to each segment and segment fragment. A confidence score may be computed for each segment and segment fragment based on the probability that the audio in each segment and segment fragment corresponds to one of the plurality of sources. An exemplary illustration of an output file is described below with reference to FIG. 5. According to one or more examples, the output provided at step 408 can be used to identify the sources of varied durations of an audio file.

FIG. 5 illustrates an exemplary output of the systems and methods described herein. A series of headers is provided in the first row of the exemplary output with an identification of the data contained in each column. The first column in the exemplary output provides an indication of the input audio file, for instance "example_audio.wav." The second and third column provide exemplary time marks. The second column provides the start time for each segment fragment and the third column provides the duration of each segment fragment. For example, the time in second row of the second column indicates a start time of 0 because this time mark indicates the start of the audio file. The duration of the first segment fragment in the exemplary output, provided in the second row of the third column, indicates a time mark of 0.12. This duration corresponds to the start time of the second segment fragment, indicated in the third row of the second column, which is equivalent to the start time of the first segment fragment plus the duration of the first segment fragment. The fourth column provides a speaker label (identifier) for each segment fragment, and the fifth column provides a confidence score indicating the confidence level that the correct speaker label (identifier) was assigned to each segment fragment. Thus, the second through fifth columns of the exemplary output correspond to the time marks, identifiers, and confidence scores assigned to each segment fragment in the audio file.

Columns six through eight of the exemplary output file provide the time marks and confidence scores corresponding to each segment, or group of segment fragments originating from the same source. Each segment in the exemplary output is a group of contiguous segment fragments wherein each segment fragment is assigned the same identifier, for instance "controller" or "pilot." Column six provides time marks indicating the start time of each segment. In this exemplary output, the start time of the first segment is the start time of the first segment fragment of a segment in which each segment fragment is assigned a speaker label (identifier) of "controller." The time mark is provided in the both the first and last row of the first segment. The time mark indicating the start time of the second segment is provided in the first and last row of the second segment and corresponds to the start time of the first segment fragment of the second segment, in which each segment fragment is assigned the speaker label (identifier) "pilot."

Column seven of the exemplary output provides time marks corresponding to the end time of each segment. In this exemplary output, the end time of the first segment is equivalent to the start time to the last segment fragment in the first segment plus the duration of the last segment fragment in the first segment. Thus, in this exemplary output, the end time of the first segment would be computed as follows: 2.25+0.57=2.82, wherein 2.25 is the start time of the last segment fragment in the first segment, 0.57 is the duration of the last segment fragment in the first segment, and the result, 2.82, is the end time of the first segment. The end time of the second segment is computed in a similar manner using the start time and duration of the last segment fragment in the second segment, and the time mark corresponding to the end time of the second segment is provided in row twenty of column seven.

Column eight of the exemplary output provides a confidence score for each segment. The segment confidence score represents the overall confidence level that the correct speaker label (identifier) has been assigned to each segment fragment within the segment.

Figure 6:
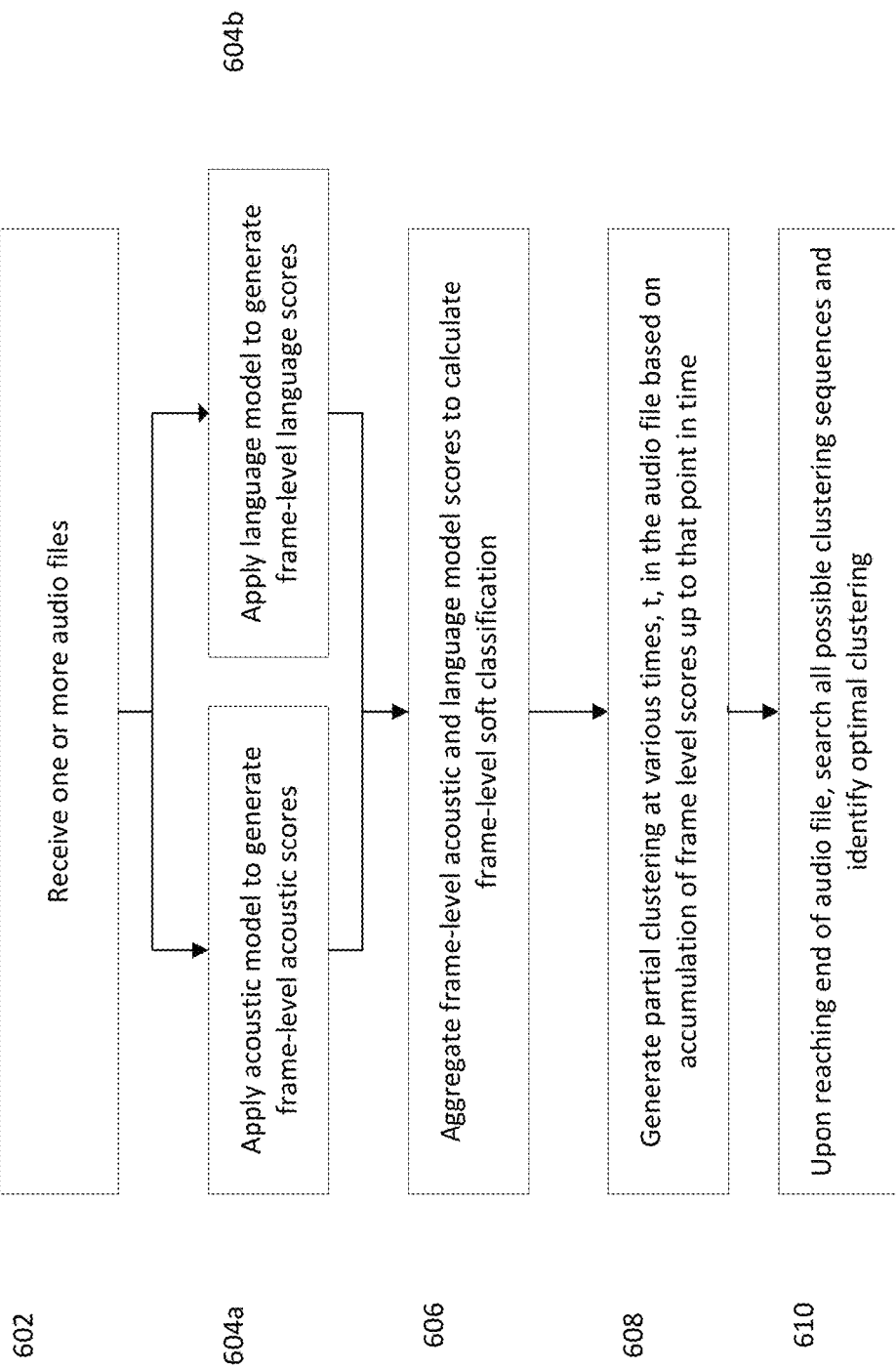
FIG. 6 illustrates a flow diagram of the clustering and classifying processes in accordance with the examples described herein.

FIG. 6 illustrates an exemplary algorithm that may be used to perform ASR based SRID in accordance with step 406 in FIG. 4. According to one or more examples the clustering and classifying processes can begin at step 602 of process 600, wherein one or more audio files may be received. Upon receipt of the one or more audio files, a clustering and classifying process may be applied to the one or more audio files wherein the clustering and classifying process comprises applying one or more acoustic models and one or more language models to cluster and classify the audio in the audio file. At 604a, one or more acoustic models may be applied to the audio file to generate one or more acoustic scores corresponding to one or more sources of audio in the audio file. In one or more examples, an acoustic model for controller speech may be designated AM(C), an acoustic model for pilot speech may be designated AM(P), and an acoustic model for silence may be designated AM(silence). For each frame in the one or more audio files, at time t, a plurality of acoustic scores may be calculated (e.g., {score(C,V(t))>0.0, score(P,V(0)>0.0, score(silence, V(t))}, wherein Score(C,V(t))+Score(P,V(t))+Score(silence,V(t))= 1.0), wherein each acoustic score represents the probability that the audio in the given frame corresponds to one of the one or more sources calculated for each frame based upon one frame of speech feature vector. It should be understood that the foregoing description is not meant to be limiting. In one or more examples, additional acoustic models may be created. For instance, in one or more examples, pilot speech can be modeled by more than one model (e.g. "female pilot" and "male pilot").

In one or more examples, one or more statistical language models may be implemented at step 604b to predict the probability that audio in each frame in the audio file corresponds to one of the one or more sources based on the relationship of a previous frame to one of the one or more sources. For instance, the statistical language model may predict the probability that controller speech will follow controller speech, or that pilot speech will follow controller speech. Alternatively, the statistical language model may predict the probability that pilot speech will follow pilot speech, or that controller speech will follow pilot speech. This probability may be designated a statistical language model score. In one or more examples, the probabilities described above may be represented as follows, wherein the sum of all possible probabilities is 1.0:

Prob($C,t|C,t-1$)=Probability $C$ will appear after $C$ given the previous two labels were controller Prob($P,t|C,t-1$)=Probability $P$ will appear after $C$ given the previous two labels were controller Prob($P,t|P,t-1$)=Probability $P$ will appear after $P$ given the previous two labels were pilot Prob($C,t|P,t-1$)=Probability $C$ will appear after $P$ given the previous two labels were pilot According to one or more examples, at step 606, the system may aggregate the frame level acoustic score and language model scores to calculate a combined frame level score, or frame level soft classification, associated with each audio source. An identifier may be assigned to each frame based on the combined acoustic and language model scores. For instance, at step 606, for audio A of duration T, with frames at t=0, 1, 2, . . . T, a frame level soft classification may be calculated as the combination of the acoustic model score and statistical language model score. For example, omitting scores for silence for the purposes of this exemplary description, the following four possible combined scores may represent the frame level soft classification:

Prob(controller,$t$)=Score(controller,$V(t)$)·
$P$(controller,$t$|controller,$t-1$)>0

Prob(controller,$t$)=Score(controller,$V(t)$)·
$P$(controller,$t$|pilot,$t-1$)>0

Prob(pilot,$t$)=Score(pilot,$V(t)$)·$P$(pilot,$t$|
controller,$t-1$)>0

Prob(pilot,$t$)=Score(pilot,$V(t)$)·$P$(pilot,$t$|pilot,$t-1$)>0

Thus, a frame level soft classification is a non-zero probability between zero and one determined for each of the identified sources corresponding to whether the frame comprises audio from each of the identified sources. Accumulated frame level scores are used for clustering at step 608.

According to one or more examples, at step 608, the system may generate a partial clustering at various times, t, wherein the partial clustering comprises all possible clustering sequences based upon the accumulation of frame level scores up to time t and wherein the clustering with the highest score at time, t, is the optimal clustering at time, t. According to one or more examples, each possible clustering may comprise audio which has been assigned identifiers corresponding to the speaker for the segments of audio and/or the segment fragments in the audio file.

According to one or more examples, at step 610, upon reaching the end of the audio file, the system may search all possible clustering sequences and identify the clustering sequence with the highest score as the final clustering. It should be understood that step 610 is not separate from the clustering and classifying process described with respect to step 608 above. The steps are merely separated here for descriptive purposes to clarify that the clustering generated at step 610 represents the final clustering. In one or more examples, the process is a time series wherein partial clustering takes place at various times in the audio file, and upon reaching the end of the audio file, the final clustering is automatically determined by identifying the clustering with the highest score. In one or more examples, the clustering process includes searching all possible time intervals. According to one or more examples, at step 610, the system may select the clustering sequence with the highest score as the final clustering, grouping sequences of audio originating from the same source into segments of varying duration.

For instance, the system may identify the following clustering sequences as all of the possible clustering sequences along with the score associated with each respective sequence: Score(PPPCCCPPPP)=0.2000; Score(CPCPCPCP)=0.01996; Score(PPPPP)=0.000001; ... Score (CCCCCCCCCCCC)=0.000000001. The system may identify the sequence PPPCCCPPPP, wherein the first "PPP" represents a segment of pilot speech and each "P" represents the identifier assigned to a segment fragment, as having the highest score and thus the system may determine that the aforementioned sequence is the final clustering. An exemplary equation used for clustering according to one or more examples is provided below:

$$\text{Clustering }(T) = \max_{score(D,T)} \{D \text{ is a label sequence}\}$$

In one or more examples, the exemplary equation provided above may be used to determine the optimal clustering by identifying all possible label sequences (i.e., contiguous durations of audio associated with the same source) and selecting the sequence with the maximum score as the optimal clustering. In one or more examples, the output of this clustering and classifying process may be substantially similar to that described above with respect to FIG. 5.

Figure 7:
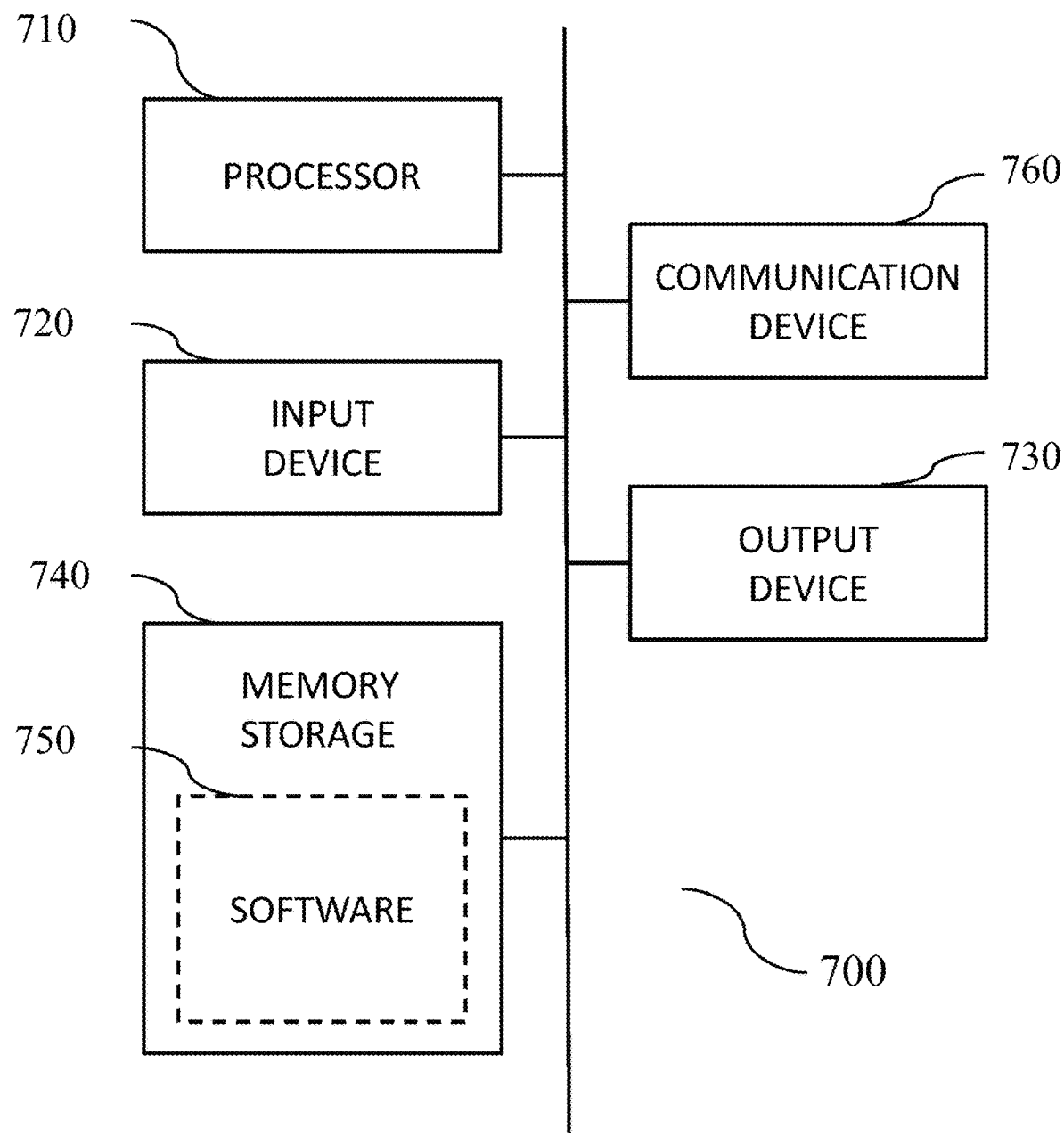
FIG. 7 illustrates an exemplary computing system according to one or more examples of the disclosure.

FIG. 7 illustrates an example of a computing system 700, in accordance one or more examples of the disclosure. System 700 can be a client or a server. As shown in FIG. 7, system 700 can be any suitable type of processor-based system, such as a personal computer, workstation, server, handheld computing device (portable electronic device) such as a phone or tablet, or dedicated device. The system 700 can include, for example, one or more of input device 720, output device 730, one or more processors 710, storage 740, and communication device 760. Input device 720 and output device 730 can generally correspond to those described above and can either be connectable or integrated with the computer.

Input device 720 can be any suitable device that provides input, such as a touch screen, keyboard or keypad, mouse, gesture recognition component of a virtual/augmented reality system, or voice-recognition device. Output device 730 can be or include any suitable device that provides output, such as a display, touch screen, haptics device, virtual/augmented reality display, or speaker.

Storage 740 can be any suitable device that provides storage, such as an electrical, magnetic, or optical memory including a RAM, cache, hard drive, removable storage disk, or other non-transitory computer readable medium. Communication device 760 can include any suitable device capable of transmitting and receiving signals over a network, such as a network interface chip or device. The components of the computing system 700 can be connected in any suitable manner, such as via a physical bus or wirelessly.

Processor(s) 710 can be any suitable processor or combination of processors, including any of, or any combination of, a central processing unit (CPU), field programmable gate array (FPGA), and application-specific integrated circuit (ASIC). Software 750, which can be stored in storage 740 and executed by one or more processors 710, can include, for example, the programming that embodies the functionality or portions of the functionality of the present disclosure (e.g., as embodied in the devices as described above). For example, software 750 can include one or more programs for performing one or more of the methods disclosed herein.

Software 750 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 740, that can contain or store programming for use by or in connection with an instruction execution system, apparatus, or device.

Software 750 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport computer readable medium can include, but is not limited to, an electronic, magnetic, optical, electromagnetic, or infrared wired or wireless propagation medium.

System 700 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as local networks within the aircraft (e.g., ethernet, wireless, or 1553) or external networks, e.g., wireless network connections, 4G, 5G, T1 or T3 lines, cable networks, DSL, telephone lines or other commercial wireless networks.

System 700 can implement any operating system suitable for operating on the network. Software 750 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated by reference.

The invention claimed is:

1. A system comprising:
one or more processors; and
a memory storing one or more programs, the one or more programs configured to be executed by the one or more processors and including instructions for:
receiving an audio file wherein the audio file comprises audio from at least a first source associated with a first speaker role and a second source associated with a second speaker role;
identifying one or more frames in the audio file, wherein each frame corresponds to a pre-determined length of time in the audio file;
generating a plurality of acoustic model scores and language model scores for an identified frame in the audio file, wherein the plurality of acoustic model scores are generated by one or more acoustic models configured to predict speaker role based on acoustic information, and wherein the plurality of language model scores are generated by one or more language models configured to predict speaker role based on at least one speaker role of one or more previous frames;
for the identified frame in the audio file:
determining a first probability that the frame is associated with the first speaker role based on a function of at least a first acoustic model score and at least a first language model score of the plurality of acoustic model scores and language model scores, and
determining a second probability that the frame is associated with the second speaker role based on a function of at least a second acoustic model score and at least a second language model score of the plurality of acoustic model scores and language model scores corresponding to the frame; and
identifying one or more segments in the audio file, wherein each segment corresponds to a group of contiguous frames associated with either the first source or the second source, wherein the identification of the one or more segments is based on the determined first and second probabilities for each frame.

2. The system of claim 1, wherein determining the first probability and the second probability comprises applying a classification process to each frame, and wherein the classification process comprises: determining, based upon a product of the acoustic scores and language scores generated for the first source, a first probability that the frame is associated with the first speaker role; determining, based upon a product of the acoustic scores and language scores generated for the second source, a second probability that the frame is associated with the second speaker role; and assigning the first probability to the first source and the second probability to the second source.

3. The system of claim 1, wherein identifying the one or more segments in the audio file comprises applying a clustering process to the identified one or more frames, wherein the clustering process comprises: generating a clustering score for each possible grouping of contiguous frames, wherein the clustering score is based upon the determined first and second probabilities for each frame; and identifying the grouping with the highest clustering score as the optimal grouping.

4. The system of claim 1, wherein the one or more identified segments comprise a plurality of segment fragments, the segment fragments comprising a plurality of frames wherein the frames in each segment fragment comprise audio determined to have originated from the same source based upon the acoustic scores and language scores calculated for each frame in the segment fragment.

5. The system of claim 1, wherein the acoustic scores are generated for each frame in the audio file based upon one frame of speech feature vector.

6. The system of claim 1, wherein the language scores are generated for each frame in the audio file based upon the relationship of a previous frame to at least one speaker role.

7. The system of claim 1, wherein the system further comprises instructions for providing an output, the output comprising: a plurality of identifiers, wherein the identifiers represent the source of audio in each segment; and a plurality of time marks, wherein the time marks represent a duration of the segments.

8. The system of claim 4, wherein the system further comprises instructions for providing an output, the output comprising: a plurality of identifiers, wherein the identifiers represent the source of audio in each segment and segment fragment; and a plurality of time marks, wherein the time marks represent the duration of the segments and segment fragments.

9. The system of claim 1, wherein the one or more acoustic models is a neural network.

10. The system of claim 1, wherein the one or more statistical language models is an n-gram statistical language model.

11. The system of claim 1, wherein the group of contiguous frames comprises frames that are adjacent in time in the audio file.

12. The system of claim 1, wherein the beginning of each segment corresponds to the beginning of a duration of audio originating from one of the first source or the second source.

13. A non-transitory computer readable storage medium storing one or more programs for processing an audio file, the one or more programs configured to be executed by one or more processors and including instructions for:
receiving an audio file wherein the audio file comprises audio from at least a first source associated with a first speaker role and a second source associated with a second speaker role;
identifying one or more frames in the audio file, wherein each frame corresponds to a pre-determined length of time in the audio file;
generating a plurality of acoustic model scores and language model scores for an identified frame in the audio file, wherein the plurality of acoustic model scores are generated by one or more acoustic models configured to predict speaker role based on acoustic information, and wherein the plurality of language model scores are generated by one or more language models configured to predict speaker role based on at least one speaker role of one or more previous frames;
for the identified frame in the audio file:
determining a first probability that the frame is associated with the first speaker role based on a function of at least a first acoustic model score and at least a first language model score of the plurality of acoustic model scores and language model scores, and determining a second probability that the frame is associated with the second speaker role based on a function of at least a second acoustic model score and at least a second language model score of the plurality of acoustic model scores and language model scores corresponding to the frame; and identifying one or more segments in the audio file, wherein each segment corresponds to a group of contiguous frames associated with either the first source or the second source, wherein the identification of the one or more segments is based on the determined first and second probabilities for each frame.

14. The non-transitory computer readable storage medium of claim 13, wherein determining the first probability and the second probability comprises applying a classification process to each frame, and wherein the classification process comprises: determining, based upon a product of the acoustic scores and language scores generated for the first source, a first probability that the frame is associated with the first speaker role; determining, based upon a product of the acoustic scores and language scores generated for the second source, a second probability that the frame is associated with the second speaker role; and assigning the first probability to the first source and the second probability to the second source.

15. The non-transitory computer readable storage medium of claim 13, wherein identifying the one or more segments in the audio file comprises applying a clustering process to the identified one or more frames, wherein the clustering process comprises: generating a clustering score for each possible grouping of contiguous frames, wherein the clustering score is based upon the determined first and second probabilities for each frame; and identifying the grouping with the highest clustering score as the optimal grouping.

16. The non-transitory computer readable storage medium of claim 13, wherein the one or more identified segments comprise a plurality of segment fragments, the segment fragments comprising a plurality of frames wherein the frames in each segment fragment comprise audio determined to have originated from the same source based upon the acoustic scores and language scores calculated for each frame in the segment fragment.

17. The non-transitory computer readable storage medium of claim 13, wherein the acoustic scores are generated for each frame in the audio file based upon one frame of speech feature vector.

18. The non-transitory computer readable storage medium of claim 13, wherein the language scores are generated for each frame in the audio file based upon the relationship of a previous frame to at least one speaker role.

19. The non-transitory computer readable storage medium of claim 13, wherein the one or more programs configured to be executed by the one or more processors further include instructions for providing an output, the output comprising: a plurality of identifiers, wherein the identifiers represent the source of audio in each segment; and a plurality of time marks, wherein the time marks represent a duration of the segments.

20. The non-transitory computer readable storage medium of claim 16, wherein the one or more programs configured to be executed by the one or more processors further include instructions for providing an output, the output comprising: a plurality of identifiers, wherein the identifiers represent the source of audio in each segment and segment fragment; and a plurality of time marks, wherein the time marks represent the duration of the segments and segment fragments.

21. The non-transitory computer readable storage medium of claim 13, wherein the one or more acoustic models is a neural network.

22. The non-transitory computer readable storage medium of claim 13, wherein the one or more statistical language models is an n-gram statistical language model.

23. The non-transitory computer readable storage medium of claim 13, wherein the group of contiguous frames comprises frames that are adjacent in time in the audio file.

24. The non-transitory computer readable storage medium of claim 13, wherein the beginning of each segment corresponds to the beginning of a duration of audio originating from one of the first source or the second source.

25. A method comprising:
receiving an audio file wherein the audio file comprises audio from at least a first source associated with a first speaker role and a second source associated with a second speaker role;
identifying one or more frames in the audio file, wherein each frame corresponds to a pre-determined length of time in the audio file;
generating a plurality of acoustic model scores and language model scores for an identified frame in the audio file, wherein the plurality of acoustic model scores are generated by one or more acoustic models configured to predict speaker role based on acoustic information, and wherein the plurality of language model scores are generated by one or more language models configured to predict speaker role based on at least one speaker role of one or more previous frames;
for the identified frame in the audio file:
determining a first probability that the frame is associated with the first speaker role based on a function of at least a first acoustic model score and at least a first language model score of the plurality of acoustic model scores and language model scores, and
determining a second probability that the frame is associated with the second speaker role based on a function of at least a second acoustic model score and at least a second language model score of the plurality of acoustic model scores and language model scores corresponding to the frame; and
identifying one or more segments in the audio file, wherein each segment corresponds to a group of contiguous frames associated with either the first source or the second source, wherein the identification of the one or more segments is based on the determined first and second probabilities for each frame.

26. The method of claim 25, wherein determining the first probability and the second probability comprises applying a classification process to each frame, and wherein the classification process comprises: determining, based upon a product of the acoustic scores and language scores generated for the first source, a first probability that the frame is associated with the first speaker role; determining, based upon a product of the acoustic scores and language scores generated for the second source, a second probability that the frame is associated with the second speaker role; and assigning the first probability to the first source and the second probability to the second source.

27. The method of claim 25, wherein identifying the one or more segments in the audio file comprises applying a clustering process to the identified one or more frames, wherein the clustering process comprises: generating a clustering score for each possible grouping of contiguous frames, wherein the clustering score is based upon the determined first and second probabilities for each frame; and identifying the grouping with the highest clustering score as the optimal grouping.

28. The method of claim 25, wherein the one or more identified segments comprise a plurality of segment fragments, the segment fragments comprising a plurality of frames wherein the frames in each segment fragment comprise audio determined to have originated from the same source based upon the acoustic scores and language scores calculated for each frame in the segment fragment.

29. The method of claim 25, wherein the acoustic scores are generated for each frame in the audio file based upon one frame of speech feature vector.

30. The method of claim 25, wherein the language scores are generated for each frame in the audio file based upon the relationship of a previous frame to at least one speaker role.

31. The method of claim 25, wherein the method further comprises providing an output, the output comprising: a plurality of identifiers, wherein the identifiers represent the source of audio in each segment; and a plurality of time marks, wherein the time marks represent a duration of the segments.

32. The method of claim 28, wherein the method further comprises providing an output, the output comprising: a plurality of identifiers, wherein the identifiers represent the source of audio in each segment and segment fragment; and a plurality of time marks, wherein the time marks represent the duration of the segments and segment fragments.

33. The method of claim 25, wherein the one or more acoustic models is a neural network.

34. The method of claim 25, wherein the one or more statistical language models is an n-gram statistical language model.

35. The method of claim 25, wherein the group of contiguous frames comprises frames that are adjacent in time in the audio file.

36. The method of claim 25, wherein the beginning of each segment corresponds to the beginning of a duration of audio originating from one of the first source or the second source.

* * * * *